United States Patent

Hodgson et al.

[11] 4,064,715
[45] Dec. 27, 1977

[54] ANTI-THEFT DEVICE

[75] Inventors: David A. Hodgson, Hamburg; James S. Grey, East Otto, both of N.Y.

[73] Assignee: International Power Pole, Ltd., Hamburg, N.Y.

[21] Appl. No.: 761,658

[22] Filed: Jan. 24, 1977

[51] Int. Cl.² .............. E05B 37/02; E05B 73/00
[52] U.S. Cl. ........................... 70/18; 70/30; 70/58; 70/233
[58] Field of Search ............ 70/14, 15, 18, 19, 30, 70/49, 57, 58, 227, 233; 211/60 SK, 5; 24/DIG. 1; 280/11.37 R, 11.37 B, 11.37 D, 11.37 H

[56] References Cited

U.S. PATENT DOCUMENTS

| 1,386,778 | 8/1921 | Gray | 70/49 |
|---|---|---|---|
| 3,335,585 | 8/1967 | Stratton | 70/58 |
| 3,354,675 | 11/1967 | Quigg | 70/58 |
| 3,800,575 | 4/1974 | Perret | 70/233 |
| 3,841,118 | 10/1974 | Stone | 70/33 |
| 3,910,602 | 10/1975 | Lindner | 70/233 |
| 3,987,653 | 10/1976 | Lyon | 70/19 |

Primary Examiner—Robert L. Wolfe
Attorney, Agent, or Firm—Christel & Bean

[57] ABSTRACT

The present anti-theft device includes a lock housing having a cable winding spool therein with the free end of the cable extending out of the housing. A control member carried by the housing includes means for locking the housing to an intermediate portion of the cable to form a closed loop. A combination lock within the housing controls locking and unlocking movements of the control member and the control member is adapted when in locked position with respect to the cable to engage the winding spool and prevent winding or unwinding movement of the spool. The housing is in the form of an elongate cylindrical member and the combination lock and the winding spool are both coaxially disposed in the cylindrical housing member.

10 Claims, 5 Drawing Figures

U.S. Patent  Dec. 27, 1977  4,064,715
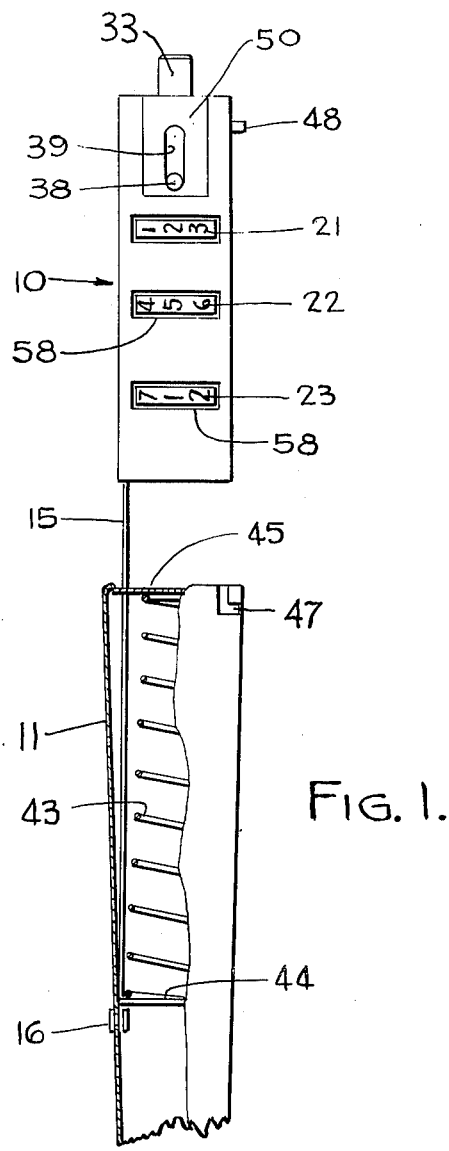
FIG. 1.
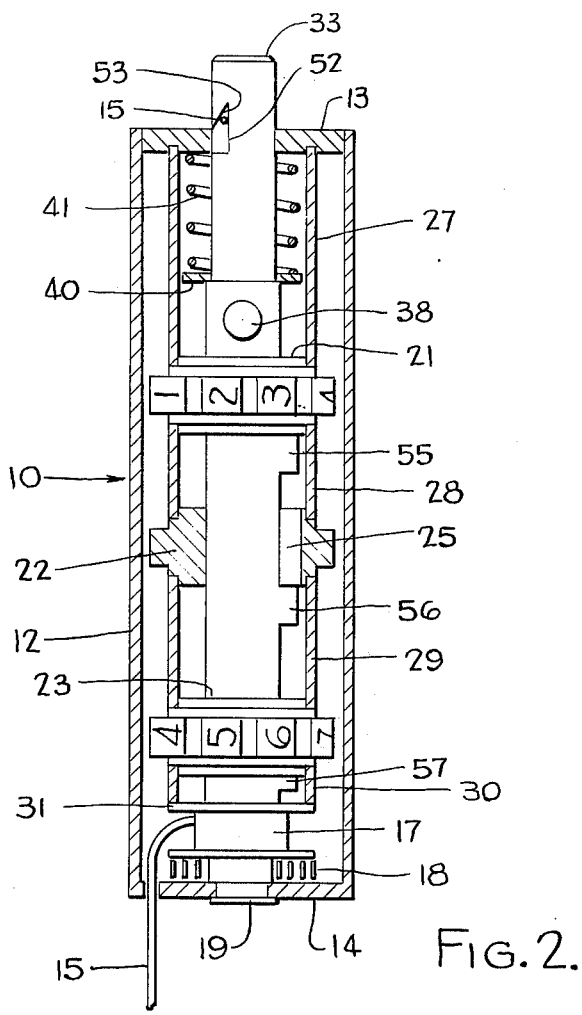
FIG. 2.
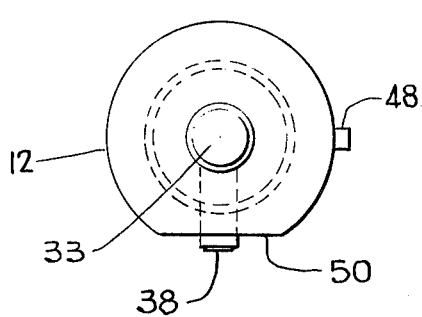
FIG. 3.
FIG. 4.
FIG. 7.
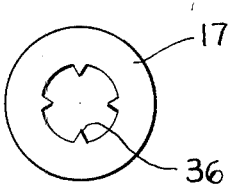
FIG. 6.
FIG. 5.

ANTI-THEFT DEVICE

BACKGROUND OF THE INVENTION

This invention relates to anti-theft devices and particularly to such devices wherein a flexible cable is adapted to be secured about an article to be secured against theft or which may extend from such article and be secured about a relatively immovable member to attach the article thereto, or wherein the cable is secured about both the article to be secured and a relatively immovable member.

Apparatus of the general type herein contemplated has previously been proposed and such examples as are known to the present applicants are shown in the following United States patents: Hurwitt U.S. Pat. No. 3,906,758, Smith U.S. Pat. No. 3,824,540, Pender U.S. Pat. No. 3,910,081, Perret U.S. Pat. No. 3,800,575, and Schwedt et al U.S. Pat. No. 3,297,333. All of the foregoing patents excepting Schwedt et al employ flexible cables in effecting their locking function but these devices are all substantially different from the device of the present invention, as will appear from a consideration of the ensuing specification, the drawing, and the claims of this application.

SUMMARY OF THE INVENTION

The device of the present invention differs from prior art proposals in that the locking device per se is fixed to the outer end of the cable and incorporates cable gripping means whereby the outer end of the cable may be return bent and locked to an intermediate point on the cable to form a secure loop around an object to be secured and a relatively fixed structure to which it is to be secured. Alternatively, the loop of the cable may extend only about the fixed structure and the inner end of the cable is fixed to the object to be secured by virtue of which the object to be secured is securely connected to the fixed structure.

In the locking means of the present invention the locking device per se comprises a compact cylindrical housing which includes a cable winding spool disposed axially therein and an adjacent cylindrical combination lock coaxial with the winding spool. A central control rod extends axially through the combination lock and is axially movable to and from locking engagement with the winding spool. Axial movements of the control rod are selectively restricted in either direction by the combination lock.

Thus the entire locking mechanism is encompassed within a relatively slender cylindrical housing which may, when not in use, be conveniently disposed within the upper end of a tubular ski pole, in one end of a bicycle handlebar, or otherwise as desired.

BRIEF DESCRIPTION OF THE DRAWING

FIG. 1 is a general elevational view of one form of the locking device of the present invention associated with a tubular housing member;

FIG. 2 is a view taken from the same point as FIG. 1 but on a larger scale and showing the locking device in axial cross-section;

FIG. 3 is a top plan view of the locking device of FIG. 2;

FIG. 4 is a top plan view of one of the annular tumbler members of the combination lock;

FIG. 5 is a top plan view of the cable winding spool;

FIG. 6 is an elevational view of the lower end of control rod 33; and

FIG. 7 is a fragmentary elevational view of the lower portion of a modified form of the locking device of the present invention.

DESCRIPTION OF THE ILLUSTRATED EMBODIMENTS

FIG. 1 of the drawing shows the locking device of the present invention, designated generally by the numeral 10, in association with a tubular member 11 which may be the upper end of a ski pole, an end of a bicycle handlebar, a tubular portion of a ski rack, or any other apparatus with which the anti-theft device of the present invention may be employed. Locking device 10 comprises a cylindrical housing 12 closed at its upper and lower ends by walls 13 and 14. A cable 15 extends from the bottom of the locking device 10 and has one of its ends attached to the interior of tubular member 11 as at 16.

The other end of cable 15 is attached to a winding spool 17 shown in the enlarged cross sectional view, FIG. 2, which illustrates the interior of locking device 10. Winding spool 17 is fixed to the outer end of a spiral spring 18 the inner end of which is anchored to a stud 19 which is fixed to the bottom wall 14 of locking device 10.

A series of three spaced coaxial annular members are disposed within cylindrical member 12 for free rotation and comprise tumblers for a combination lock. The members 21, 22 and 23 have a series of numerals at their peripheries which provide combination lock dials as shown in FIG. 4, have keyway formations 25 which are in alignment when the dial portions of the annular members are each individually rotated to proper positions according to the predetermined unlocking combination.

In order to properly space the annular members 21, 22 and 23 and support them for free rotation a series of four coaxial sleeve members designated 27, 28, 29 and 30 are provided. Upper sleeve 27 engages to wall 13 of cylindrical housing 12 and the lower end of lower sleeve 30 engages the top flange 31 of cable winding spool 17. As clearly shown in FIG. 2, the remaining ends of the series of sleeves engage necked down portions of the annular members to retain the latter in properly spaced coaxial relationship and provide rotative mounting therefor.

A control rod 33 is axially slidable in the top wall 13 of housing 12 and the several annular members 21, 22 and 23 and its bottom end has a series of axially extending grooves 35 as shown in FIG. 6 to engage complementary rib formations 36 in the bore portion of cable winding spool 17 at the lower end of housing 12 as shown in FIG. 5. Accordingly the spool 17 is restrained against rotation when the rod 33 is in its lowermost locking position.

Control rod 33 is restrained against rotation by engagement of a pin 38 extending radially therefrom through a vertical slot 39 in housing 12. Pin 38 also serves as a manipulating element for raising plunger rod 33 in housing 12 for purposes which will presently appear. The upper portion of control rod 33 is of reduced diameter and a spring supporting plate 40 seats against the ledge thus formed on rod 33. A compression coil spring 41 acts between plate 40 and the upper wall 13 of housing 12 whereby the rod 33 is resiliently urged to its lowermost position in housing 12 which is the position illustrated in FIG. 2. In this position the lower end of rod 33 which is illustrated in FIG. 6 projects into the splined opening in cable winding spool 17 and prevents rotation of the spool and any winding or unwinding movement of the spool when the rod 33 is in its lowered position.

When the locking device 10 is not in use it is housed in tubular member 11 as indicated earlier herein. A compression coil spring 43 acts between a fixed base plate 44 within tube 11 and a spring plate 45 which is vertically movable in tube 11. Spring plate 45 engages the bottom of cylindrical housing 12 when the latter is in housed position and tends to eject the housing 12 from the tube. For retaining the housing 12 in the tube 11 when that is desired the upper end of tube 11 may be provided with a bayonet slot 47 and a pin 48 carried by housing 12 cooperates with bayonet slot 47 in the usual manner.

As shown in FIG. 3, the housing 12 has a flattened upper wall portion 50 in the region of pin 38 and slot 39 to provide ready access to pin 38 for manually raising control rod 33. Referring to FIG. 2, the upper portion of control rod 33 has a notch 52 therein which includes a reentrant upper portion 53.

The control rod 33 is provided with a series of axially aligned lateral projections 55, 56 and 57 which are proportioned to move axially into the keyway formations 25 of the annular members 21, 22 and 23, respectively, when the several keyway members are in axial alignment with each other and with the projections 55, 56 and 57. It will be noted that in the locked position illustrated in FIG. 2, the several projections 55, 56 and 57 of rod 33 immediately underlie the respective annular members 21, 22 and 23. As shown in FIG. 1, the cylindrical housing 12 is provided with openings 58 for access to the peripheral dial portions of the annular members 21, 22 and 23.

If desired, a removable cup-shaped rubber cap or the like, not shown, may be applied over the end of tubular member 11 when the locking device is housed therein for protective purposes.

In an alternative from the locking device 10 may comprise a wholly separate entity not housed in a tubular member. In this alternative form the locking device 10 may be carried about in a users pocket or otherwise. In this embodiment the cable 15, instead of being attached at one end within a tube 11 as previously described, may be attached to a manipulating member which in the illustrated instance comprises a ring 60 which lies against the bottom of housing 12 when the device is not in use. In this position ring 60 limits rotation of spool 17 in a cable winding direction.

The operaton of the embodiment of FIGS. 1 through 6 will now be described, starting with the locking device 10 housed within tubular member 11 and secured by the bayonet joint 47, 48. At this time the control rod 33 will be in its raised unlocked position with the lowermost projection 57 of the control rod disposed just above its corresponding annular member 23 to retain the control rod is such raised unlocked position. The user may then grasp the upper end of control rod 33 and rotate the same to release the bayonet joint and permit the locking device 10 to be withdrawn from tube 11. When the bayonet joint is disconnected the locking device 10 is ejected from tubular member 11 by spring 43 acting against spring plate 45 which in turn pushes the locking device 10 upwardly out of the tubular member 11.

The user of the device then withdraws the cable sufficiently to permit him to loop the same about an article to which the locking device is to be secured, as for instance a structural member of a ski rack, and then brings the locking device back to the cable proper to form a secure loop and places the notch 52 of control rod 33 over the cable 15 and releases the plunger rod with the several annular members having their dial settings in the desired open combination position. The control rod 33 then moves downwardly as viewed in FIG. 2 under the impetus of spring 41 to bring the notch 52 to the locking position illustrated in FIG. 2 wherein the cable 15 is in the reentrant portion 53 of notch 52 whereupon one or more of the annular members 21, 22 and 23 are rotated from the open position of the lock to prevent upward movement of plunger rod 33 whereby the loop referred to is securely closed about the article or articles to be engaged thereby.

In using the device to lock a bicycle the locking device 10 may be moved from the handle bar of the bicycle to a wheel thereof where it may be passed between the spokes, looped about the rim and tire, and connected to the adjacent portion of cable 15 in looped fashion and locked thereto as just described.

When the locking device is to be released the several dials are moved to their lock opening positions whereby control rod may be raised by manipulation of pin 38 to release the cable from notch 52. If the locking device is to be returned to tubular member 11 the lower most annular member 23 is moved away from its lock opening position with control rod still raised to engage projection 57 under the annular member to hold control rod 33 raised during storage of the locking member 10 in tubular member 11.

In the case of the embodiment illustrated in FIG. 7, the user will grasp ring 60 in one hand, raise rod 33 by means of pin 38 to release the winding spool 17, then withdraw sufficient cable to form the desired loop about articles to be fastened, and then place notch 52 over the cable. The ring 60 may then be released and the spring tension of winding spool 17 will wind the cable sufficiently to bring ring 60 to the bottom of locking device 10 whereupon a closed loop is established around articles to be connected for locking purposes. The pin 38 will then be released whereupon control rod 33 moves inwardly to lock the device to cable 15 and lock the winding spool 17 against rotation. The procedure for unlocking and releasing the locking device is then the same as described above in connection with the embodiment of FIGS. 1 through 6.

Preferred embodiments of this invention having been described herein and illustrated in the drawings, by way of example. However, it is to be understood that numerous modifications thereof can be made without departing from the broad spirit and scope of the invention as defined in the appended claims.

We claim:

1. An anti-theft device including a flexible cable adapted to be looped about an object to be secured or about a relatively fixed member to which the object is to be secured, or both; said device comprising a housing, a cable winding spool in said housing, said cable being wound thereon and having a free end projecting from said housing, a control member carried by said housing and including means for lockingly engaging an intermediate portion of said cable along the length thereof for forming a closed loop at the outer portion of said cable, a combination lock in said housing, said control member being movable between locked and unlocked positions with respect to said cable under the control of said combination lock.

2. An anti-theft device according to claim 1 wherein said housing comprises an elongate cylindrical member and said combination lock and said winding spool are both coaxially disposed in said cylindrical housing member.

3. An anti-theft device according to claim 2 wherein said control member comprises a rod extending axially through said combination lock and movable axially for engaging and releasing operation with respect to said intermediate cable portion.

4. An anti-theft device according to claim 3 wherein movement of said control member to cable engaging position moves said control member into engagement with said winding spool to lock the latter against rotation.

5. An anti-theft device according to claim 3 wherein said control member is resiliently biased toward cable engaging position and wherein said control means incudes manually operable means for moving said control member to cable releasing position.

6. An anti-theft device according to claim 4 wherein said control member is resiliently biased toward cable engaging and winding spool locking position and wherein said control member is manually operable to move said control member to cable releasing and winding spool unlocking position.

7. An anti-theft device according to claim 2 wherein said housing is adapted to be lodged within a tubular opening in the article to be secured and means for selectively connecting said housing with said article with the housing disposed in said tubular opening.

8. An anti-theft device according to claim 7 wherein said cable is connected to said article in said tubular opening whereby withdrawing movement of said housing from said opening and away from said article unwinds cable from said spool.

9. An anti-theft device according to claim 8 having spring means within said tubular opening adapted to eject said housing from said tubular opening when said selective connecting means is released.

10. An anti-theft device according to claim 1 wherein said free end of said cable has a gripping member attached thereto to facilitate manually withdrawing cable from said spool and to limit cable winding rotation of said spool.

* * * * *